United States Patent
Lee

(10) Patent No.: US 7,094,084 B2
(45) Date of Patent: Aug. 22, 2006

(54) ELECTRICAL CONNECTOR ASSEMBLY FOR MOBILE TERMINAL

(75) Inventor: Yong-Hee Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/156,496

(22) Filed: Jun. 17, 2005

(65) Prior Publication Data

US 2005/0282420 A1    Dec. 22, 2005

(30) Foreign Application Priority Data

Jun. 18, 2004    (KR) ................. 10-2004-0045702

(51) Int. Cl.
*H01R 29/00*    (2006.01)

(52) U.S. Cl. ..................................... 439/165

(58) Field of Classification Search .............. 439/31, 439/165, 22, 67, 640

See application file for complete search history.

(56) References Cited

U.S. PATENT DOCUMENTS

| | | | | |
|---|---|---|---|---|
| 4,463,084 A | * | 7/1984 | Mitsumori et al. | 430/315 |
| 4,594,698 A | * | 6/1986 | Hefer | 367/188 |
| 2004/0002242 A1 | * | 1/2004 | Sasaki | 439/165 |
| 2004/0077199 A1 | * | 4/2004 | Winstead et al. | 439/165 |

* cited by examiner

*Primary Examiner*—James R. Harvey
(74) *Attorney, Agent, or Firm*—Lee, Hong, Degerman, Kang & Schmadeka

(57) ABSTRACT

An electrical connector assembly is disposed in a mobile terminal comprising a first body coupled to a second body by a hinge portion, and the electrical connector assembly comprises a fixed member disposed in the hinge portion, having at least one first contact. The electrical connector assembly also comprises a rotating member disposed in the hinge portion, rotatably connected to the fixed member, the rotating member comprising at least one second contact that electrically connected to the at least one first contact of the first member. The electrical connector assembly may further comprise a first flexible printed circuit board configured to electrically connect the fixed member to a first printed circuit board of the first body, and a second flexible printed circuit board configured to electrically connect the rotating member to a second printed circuit board of the second body.

23 Claims, 7 Drawing Sheets

ELECTRICAL CONNECTOR ASSEMBLY FOR MOBILE TERMINAL

CROSS-REFERENCE TO RELATED APPLICATIONS

Pursuant to 35 U.S.C. § 119(a), this application claims the benefit of earlier filing date and right of priority to Korean Application No. 10-2004-0045702, filed on Jun. 18, 2004, the contents of which are hereby incorporated by reference herein in their entirety.

FIELD OF THE INVENTION

The present invention relates generally to a mobile terminal and, more particularly, to an electrical connector assembly for a mobile terminal.

BACKGROUND OF THE INVENTION

FIG. 1 is a perspective view illustrating a related art mobile terminal. FIG. 2 is a perspective projection illustrating an installation structure of a flexible printed circuit board of a hinge portion of the related art mobile terminal. FIG. 3 is a perspective view illustrating the flexible printed circuit board of the related art mobile terminal.

Referring to FIGS. 1–3, the related art mobile terminal 10 includes a plurality of selection buttons 11, a first body 13 installed with a first printed circuit board (PCB) 12 electrically connected to the selection buttons 11, and a second body 16 provided with a screen window 15 and rotatably installed at one side of the first body 13 so as to be openable or closable by a hinge portion 14.

Furthermore, a flexible printed circuit board (FPCB) 17 is installed inside the hinge portion 14. The FPCB 17 electrically connects a second printed circuit board installed inside the second body 16 to the first PCB 12 installed inside the first body 13.

As shown in FIG. 3, regarding the FPCB 17, when a user opens or closes the second body 16, bending and extension occur at a bent region "II", and torsion occurs at a torsion region "III" indicated by a torsion distance "d" and a torsion width "w". Furthermore, breakage occurs at a region "IV" contacting with the hinge portion 14.

Additionally, when the second body 16 is opened to a 90 degree angle or greater, the stress of the FPCB 17 is zero. However, when the second body is closed, the stress of the FPCB 17 becomes excessive, thereby breaking or damaging the FPCB 17.

Thus, in the mobile terminal, when the user opens or closes the second body, torsion, bending, extension and breakage may occur at the FPCB, thereby breaking or damaging the FPCB.

SUMMARY OF THE INVENTION

Accordingly, the present invention is directed to an electrical connector assembly for a mobile terminal and mobile terminal provided with the same that substantially obviates one or more problems due to limitations and disadvantages of the related art.

An object of the present invention is to provide an electrical connector assembly for a mobile terminal and a mobile terminal provided with the same capable of preventing breakage or damage to a flexible printed circuit board (FPCB) and to improve reliability of the mobile terminal by providing a circuit connection structure inside a hinge portion between a first body and a second body.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, an electrical connector assembly is disposed in a mobile terminal comprising a first body coupled to a second body by a hinge portion, and the electrical connector assembly comprises a fixed member disposed in the hinge portion, having at least one first contact. The electrical connector assembly also comprises a rotating member disposed in the hinge portion, rotatably connected to the fixed member, the rotating member comprising at least one second contact that is electrically connected to the at least one first contact of the first member.

The electrical connector assembly may further comprise a first flexible printed circuit board configured to electrically connect the fixed member to a first printed circuit board of the first body. The electrical connector assembly may further comprise a second flexible printed circuit board configured to electrically connect the rotating member to a second printed circuit board of the second body.

The fixed member may comprise a housing having a receiving space at a first side and a disc installed inside the receiving space, the disc having circuit patterns on a first side and a second side. The fixed member may also comprise an inter-connector configured to electrically connect the housing to the disc, the inter-connector installed inside the receiving space to elastically support the disc.

The rotating member may comprises a plurality of housings successively and rotatably coupled to each other, each of the plurality of housings configured to provide a receiving space at a first side and having a plurality of contacts at a second side. The rotating member may also comprise a plurality of discs installed inside the receiving space of each of the plurality of housings, the plurality of discs having circuit patterns on a first side and a second side. The rotating member may also comprise an inter-connector configured to electrically connect the plurality of contacts with the plurality of discs, the inter-connector installed inside the plurality of housings to elastically support the plurality of discs. The rotating member may further comprise a plurality of rotating parts and wherein a rotating part at a first end of the rotating member is rotatably coupled to the fixed member and a rotating part at a second end of the rotating member is fixed to the second body. Each contact of the rotating part at the first end of the rotating member may contact a circuit pattern of a disc installed inside the housing of the fixed member. Furthermore, each contact of the plurality of rotating parts may contact with a corresponding circuit pattern.

The second flexible printed circuit board may be configured to electrically connect the at least one of the plurality of rotating parts to the second printed circuit board of the second body. When a user opens or closes the second body, the plurality of rotating part may be sequentially and successively rotated by an angle of 30°, for example. The electrical connector assembly may also comprise a stopping protrusion and a stopping groove, formed at a housing of each of the plurality of rotating parts such that when the user opens or closes the second body, the plurality of rotating parts are sequentially and successively rotated. The fixed member and/or the rotating member may have a round shape.

In another embodiment, a mobile terminal having an electrical connector assembly comprises a first body and a second body rotatably connected to the first body by a hinge portion. The hinge portion comprises a fixed member having at least one first contact and a rotating member, rotatably connected to the fixed member, the rotating member comprising at least one second contact that is electrically connected to the at least one first contact of the fixed member.

The rotating member may further comprise a plurality of rotating parts and wherein a rotating part at a first end of the rotating member is rotatably coupled to the fixed member and a rotating part in between the first end of the rotating member and a second end of the rotating member is fixed to the second body.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
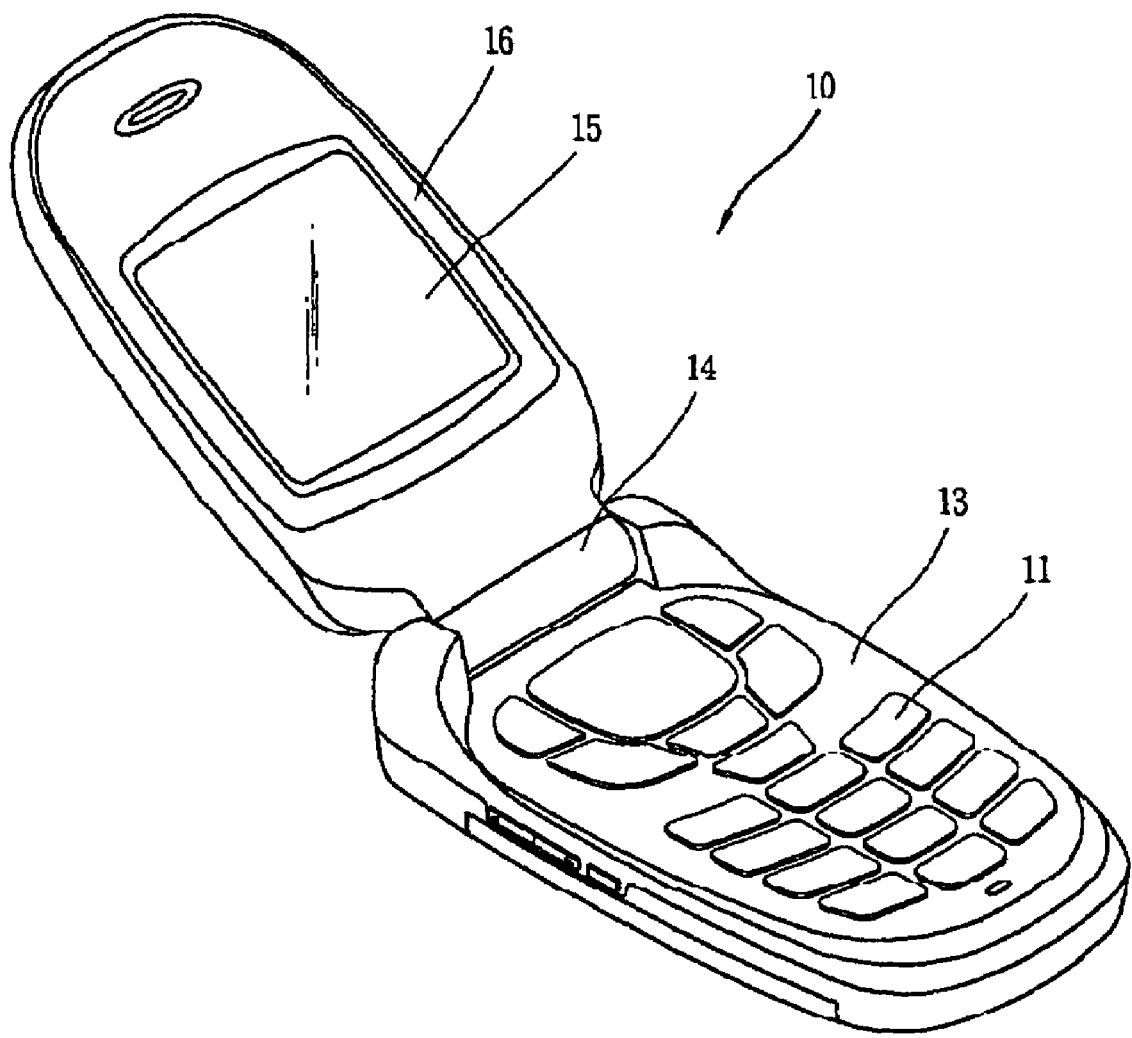
FIG. 1 is a perspective view illustrating a related art mobile terminal.
Figure 2:
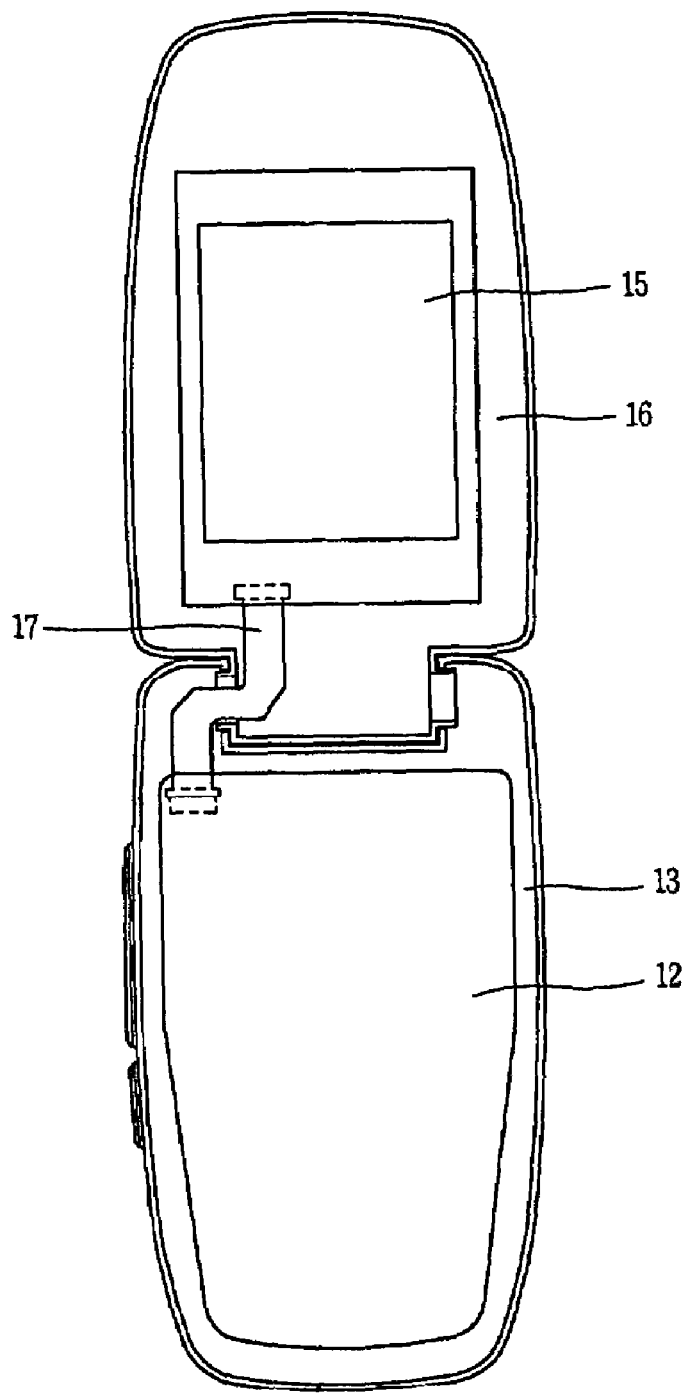
FIG. 2 is a perspective projection illustrating an installation structure of a flexible printed circuit board of a hinge portion of the related art mobile terminal.
Figure 3:
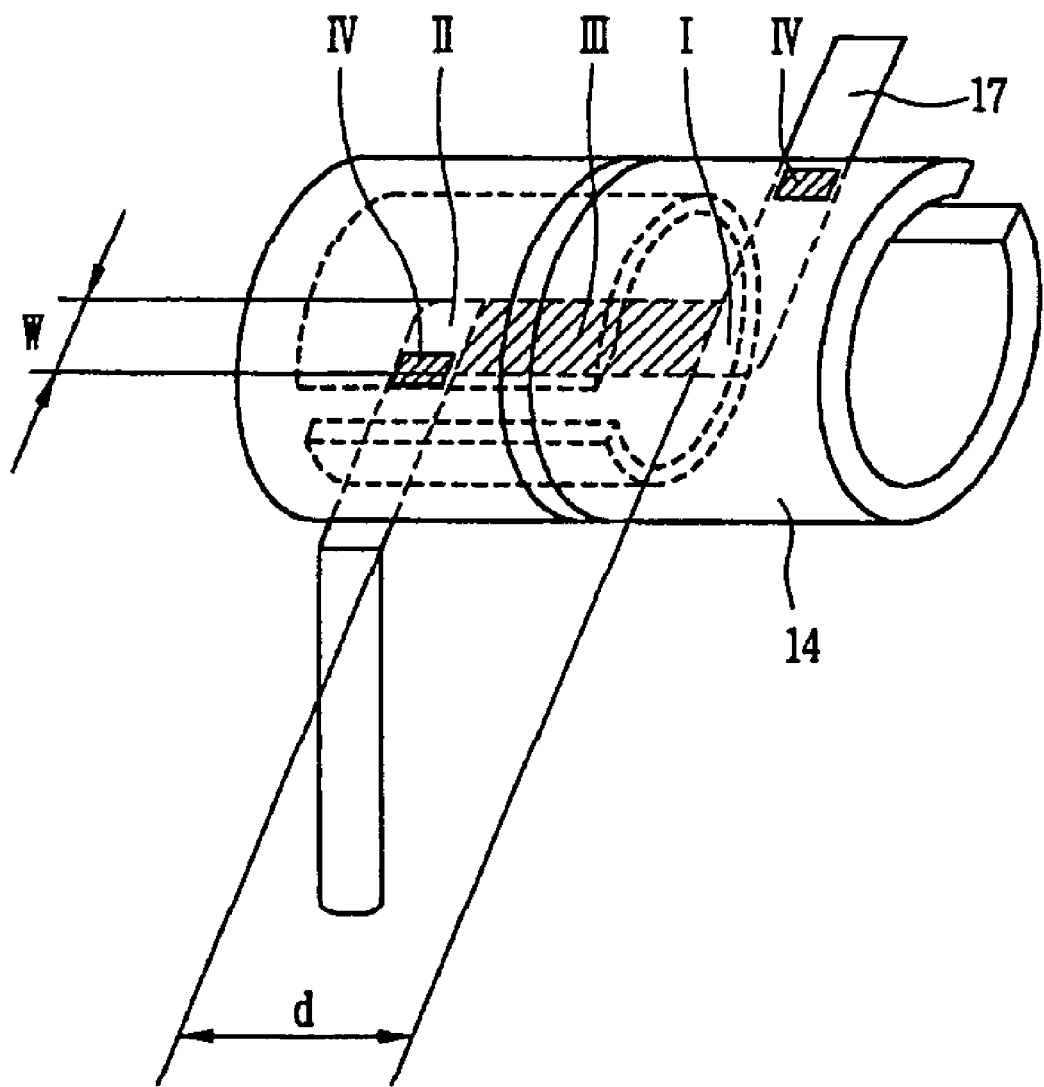
FIG. 3 is a perspective view illustrating the flexible printed circuit board of the related art mobile terminal.
Figure 4:
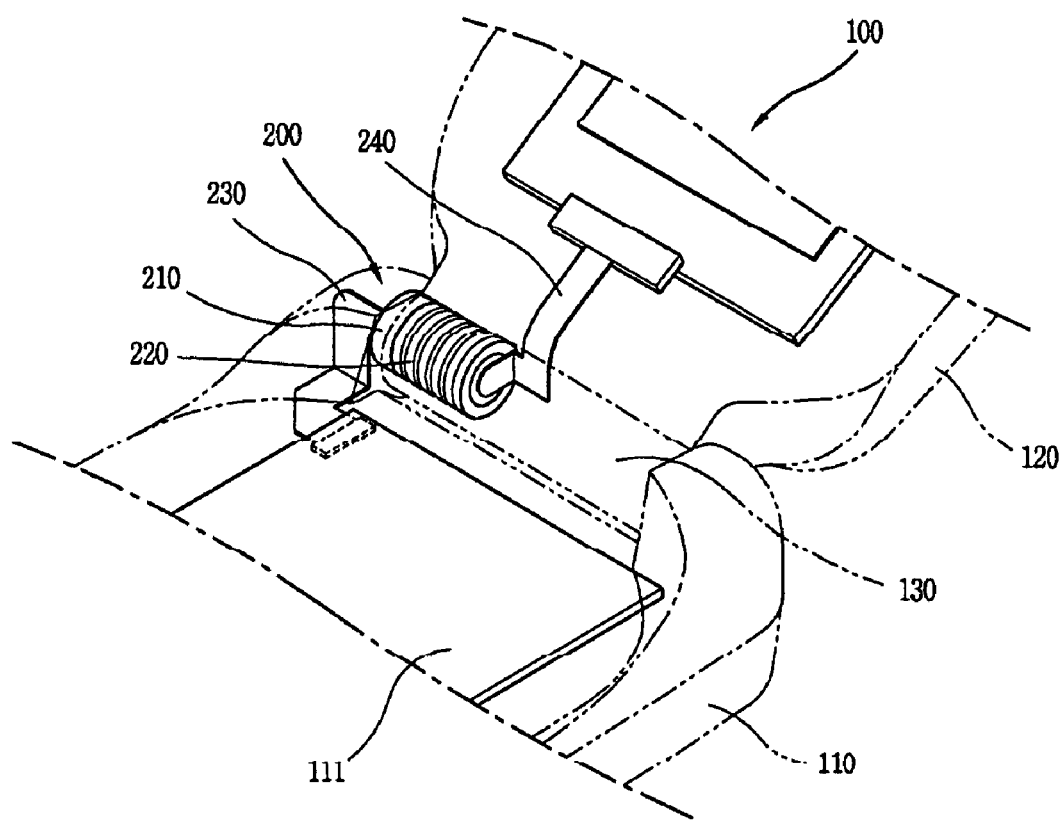
FIG. 4 is a perspective projection illustrating a portion of a mobile terminal, according to one embodiment of the present invention.
Figure 5:
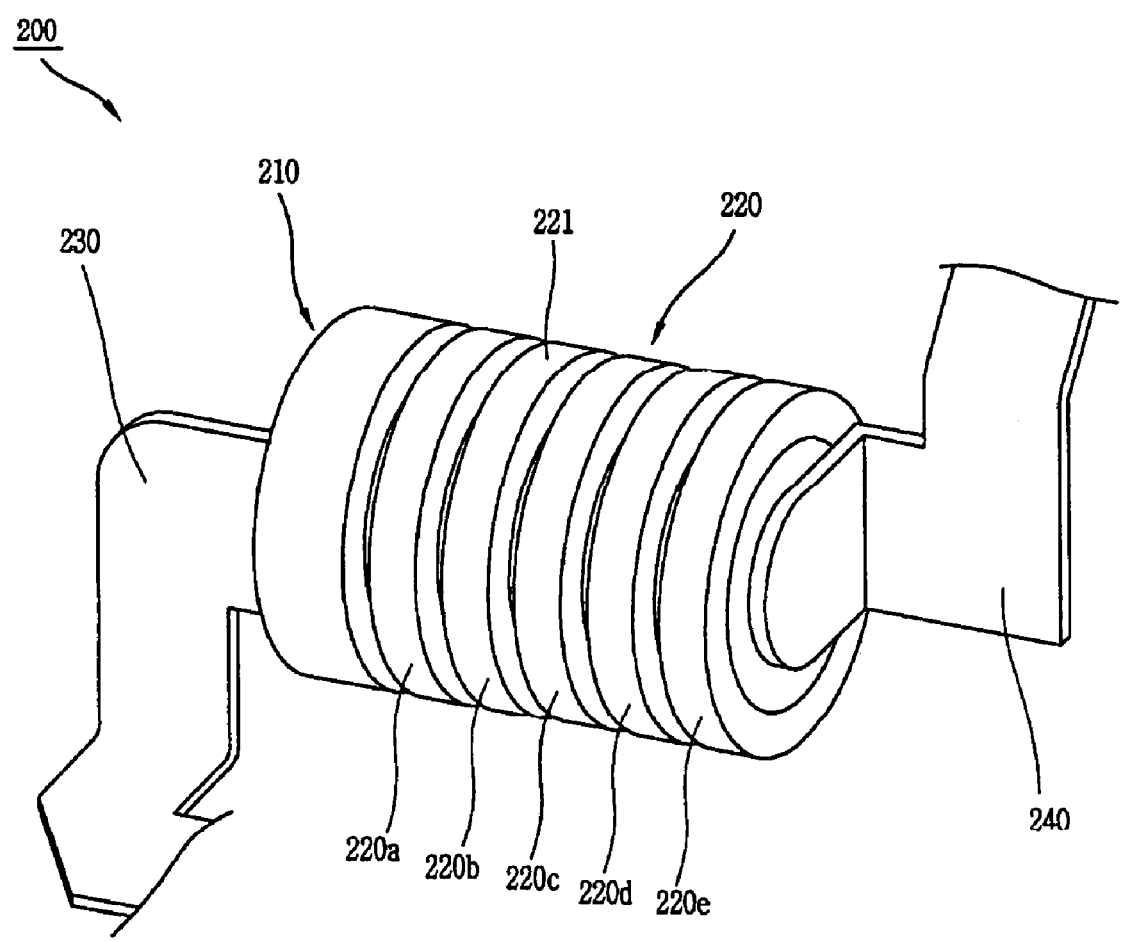
FIG. 5 is an assembled perspective view illustrating an electrical connector assembly of the mobile terminal, according to one embodiment of the present invention.

FIG. 4 is a perspective projection illustrating a portion of a mobile terminal, according to one embodiment of the present invention. FIG. 5 is an assembled perspective view illustrating an electrical connector assembly of the mobile terminal, according to one embodiment of the present invention.

Referring to FIGS. 4 and 5, a mobile terminal 100 is provided with an electrical connector assembly in accordance with a preferred embodiment of the present invention. The mobile terminal 100 includes a first body 110, a second body 120 installed at one end of the first body 110 configured to be opened and/or closed at a hinge portion 130. The mobile terminal 100 also includes an electrical connector assembly 200 installed inside the hinge portion 130, configured to electrically connect a first printed circuit board (PCB) 111 of the first body 110 with a second printed circuit board of the second body 120.

The electrical connector assembly 200 may include a fixed member 210 fixed inside the hinge portion 130 between the first body 110 and the second body 120. The electrical connector assembly 200 may also include a rotating member 220 installed inside the hinge portion 130 and rotatably coupled to the fixed member 210 configured to be electrically connected to the fixed member 210. The electrical connector assembly 200 may also include a first flexible printed circuit board (FPCB) 230 configured to electrically connect the fixed member 210 to the first PCB 111 of the first body 110. The electrical connector assembly 200 may also include a second flexible printed circuit board 240 configured to electrically connect the rotating member 220 to the second printed circuit board 121 of the second body 120. In order to provide for smooth rotation of the rotating member 220, the fixed member 210 and the rotating member 220 may preferably be constructed in rounded shapes. The fixed member 210 may be fixed to the hinge portion 130, and the rotating member 220 may be rotatably coupled to the fixed member 210. Even while rotating, the rotating member 220 may preferably be electrically connected to the fixed member 210. Structures of the fixed member and the rotating member are described below.

Figure 6:
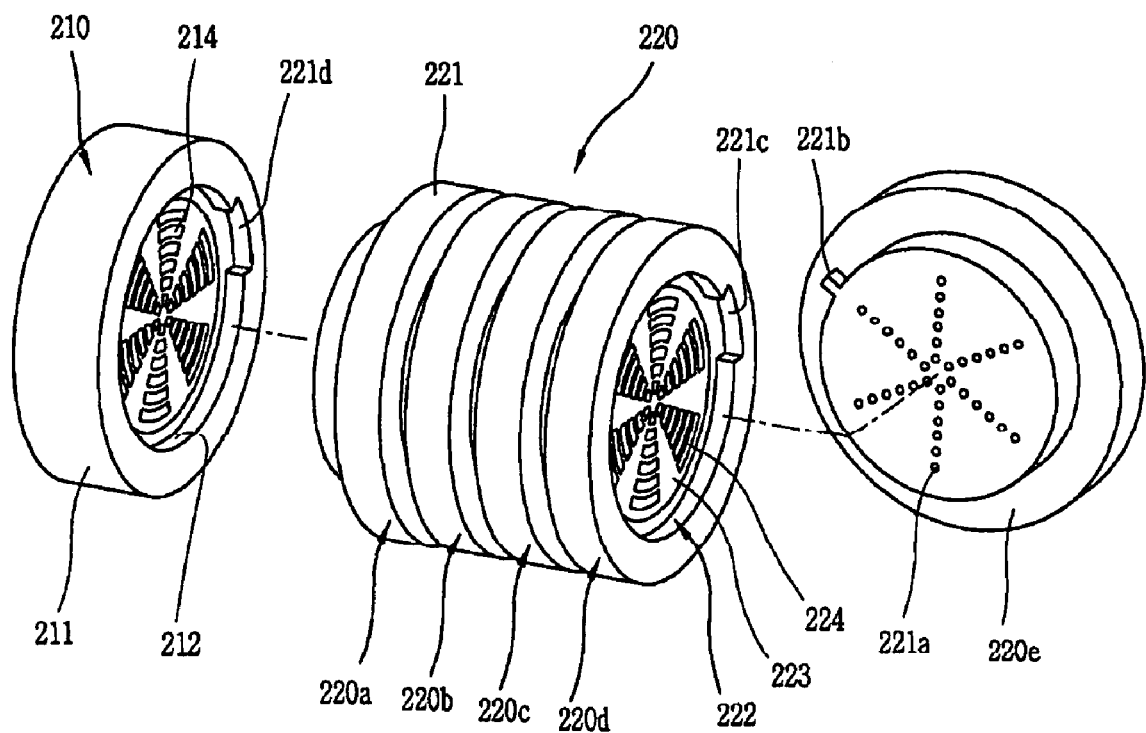
FIG. 6 is an exploded perspective view illustrating the electrical connector assembly of the mobile terminal, according to one embodiment of the present invention.
Figure 7:
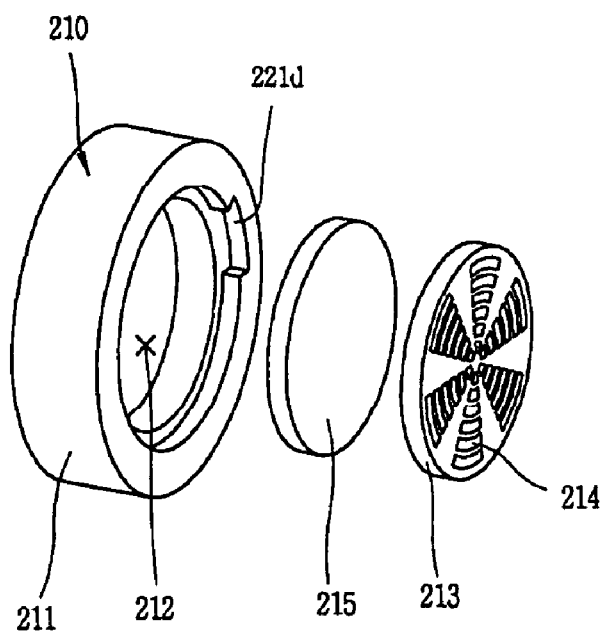
FIG. 7 is an exploded perspective view illustrating a fixed member of the mobile terminal, according to one embodiment of the present invention.

FIG. 6 is an exploded perspective view illustrating the electrical connector assembly of the mobile terminal, according to one embodiment of the present invention. FIG. 7 is an exploded perspective view illustrating a fixed member of the mobile terminal, according to one embodiment of the present invention.

Referring to FIGS. 6 and 7, the fixed member 210 includes a housing 211 to provide a receiving space 212 and a stopping groove 221d at an inner circumference of the receiving space 212. The fixed member 210 also includes a disc 213 installed in the receiving space 212 of the housing 221. The disc 213 has circuit patterns 214 on opposing sides. That is, the disc 213 has circuit patterns 214 on both of the substantially flat surfaces of the disc 213. An inter-connector 215 may electrically connect the FPCB 230 to the disc 213 and may be installed in the receiving space 212 of the housing 211 so as to elastically support the disc 213. It is also possible to electrically connect the disc 213 to the FPCB 230, directly.

Figure 8:
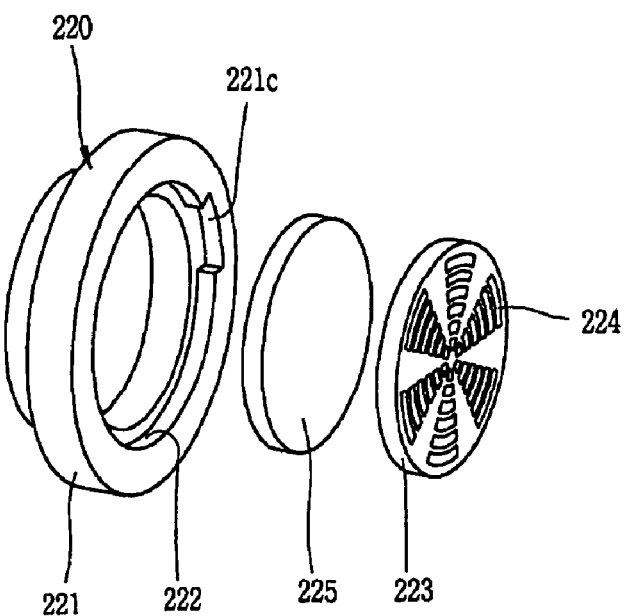
FIG. 8 is an exploded perspective view illustrating a rotating member of the mobile terminal, according to one embodiment of the present invention.

FIG. 8 is an exploded perspective view illustrating a rotating member of the mobile terminal, according to one embodiment of the present invention.

Referring to FIG. 8, the rotating member 220 may include a plurality of housings 221 successively and rotatably coupled to each other. Each of the plurality of housings 221 provides a receiving space at one side and a plurality of ball contact points 221a at the opposite side. A disc 223 is installed in the receiving space 222 of each housing 221 and has circuit patterns on opposing sides. An inter-connector 225 electrically connects the ball contact points 221a of the housing 221 to the disc 223 and is installed inside the housing 221 to elastically support the disc 223.

Referring again to FIG. 7, the inter-connector 215 of the fixed member 210 is configured to electrically connect each circuit pattern 214 of the disc 213 to each ball contact point 221a of the housing 221. The inter-connector 215 is preferably made with silicon rubber having conductive wire to allow electrical connection between each circuit pattern to a respective ball contact point.

The inter-connector 215 also pushes the circuit pattern 214 of the disc 215 toward the ball contact point 221a to allow the circuit pattern 214 of the disc 215 and the ball contact point 221 a to maintain elastic contact between the circuit pattern 214 and the ball contact point 221a.

Referring again to FIG. 8, the inter-connector 225 of the rotating member 220 also electrically connects each circuit pattern 224 of the disc 223 to each ball contact point 221a of the housing 221. The inter-connector 225 is preferably made with silicon rubber having conductive wire to allow electrical connection between each circuit pattern to a respective ball contact point. The inter-connector 225 also pushes the circuit pattern 224 of the disc 223 toward the ball contact point 221a to allow the circuit pattern 224 of the disc 225 and the ball contact point 221a to maintain elastic contact between the circuit pattern 224 and the ball contact point 221a. The rotating member 220 also includes a plurality of constituent elements, such as for example, five constituent elements. Because the rotating member 220 includes a plurality of constituent elements, the rotating member 220 may be smoothly rotated in the rotating of the second body 120 while the electrical connection between the fixed member 210 and the rotating member 220 is maintained. The constituent elements may be, for example, rotating parts. Thus, the rotating member 220 may include a first rotating part 220a rotatably coupled to the fixed member 210, a second rotating part 220b rotatably coupled to the first rotating part 220a, a third rotating part 220c rotatably coupled to the second rotating part 220b, a fourth rotating part 220d rotatably coupled to the third rotating part 220c, and a fifth rotating part 220e rotatably coupled to the fourth rotating part 220d. The first through fifth rotating parts 220a–220e may preferably have the same shape and structure.

Referring again to FIG. 6, each ball contact point 221a of the first rotating part 220a may contact each circuit pattern 214 of the disc 213 installed inside the housing 221 of the fixed member 210. Each ball contact point 221a of the second to fifth rotating parts 220b–220e may contact each circuit pattern 224 that is adjacent and corresponding thereto. When the user opens or closes the second body 120, the fifth rotating part 220e, the fourth rotating part 220d, the third rotating part 220c, the second rotating part 220b and the first rotating part 220a may be sequentially and successively rotated by a predetermined angle, such as about 30°. In other words, a stopping protrusion 221b and a stopping groove 221c may be formed at the housing 221 of each of the first to fifth rotating parts 220a–220e, such that when a user opens or closes the second body 120, the fifth rotating part 220e, the fourth rotating part 220d, the third rotating part 220c, the second rotating part 220b and the first rotating part 220a are sequentially and successively rotated. A stopping groove 221d may be formed at one side of the first rotating part 220a and a stopping protrusion 221b may be formed at one side of the fifth rotating part 220e while the stopping protrusions 221b and the stopping grooves 221c may be formed at both sides of the second rotating part 221b, the third rotating part 220c and the fourth rotating part 220d.

The stopping protrusion 221b of the first rotating part 220a may be coupled to the stopping groove 221d of the fixed member 210. Accordingly, when the user opens or closes the second body 120, the rotating member 220 may be smoothly rotated to the open or closed angle of the second body 120.

The first FPCB 230 may electrically connect the fixed member 210 to the first PCB 11. The second FPCB 240 may electrically connect the second printed circuit board of the second body to the rotating member 220. For example, the second FPCB 240 may electrically connect the second printed circuit board of the second body to the fifth rotating part 220e.

An exemplary operation of the electrical connector assembly 200 of the mobile terminal 100 is described below. When the user opens the second body 120, the fifth rotating part 220e fixed to the second body 120 is rotated. Because the stopping protrusion 221b and the stopping groove 221c are formed at the housing 221 of each of the first to fifth rotating parts 220a–220e, the fifth rotating part 220e, the fourth rotating part 220d, the third rotating part 220c, the second rotating part 220b, and the first rotating part 220a are successively rotated by an angle of about 30°, for example. Accordingly, the second body may be opened to an angle of about 150°. The elastic contact between the circuit patterns 214 of the disc 213 and the ball contact points 221a is maintained by the inter-connector 215 mounted in the receiving space 212 of the housing 221 of the fixed member 210. Furthermore, the elastic contact between the circuit patterns 224 of the disc 223 and the ball contact points 221a is maintained by the inter-connector 225 mounted in the receiving space 222 of the housing 221 of the rotating member 220. Accordingly, an electrical signal may be transmitted to the first FPCB 230 connected to the first PCB 111, the fixed member 210, the rotating member 220, the second FPCB 240, and the second printed circuit board of the second body 120. In contrast, when the user closes the second body 120, the fifth rotating part 220e fixed to the second body 120, to the first rotating part 220a are rotated in reverse order of the aforementioned 'opening' operation. Accordingly, the second body 120 is rotated by an angle of about 150° and closed.

In one embodiment, an electrical connector assembly is disposed in a mobile terminal comprising a first body coupled to a second body by a hinge portion, and the electrical connector assembly comprises a fixed member disposed in the hinge portion, having at least one first contact. The electrical connector assembly also comprises a rotating member disposed in the hinge portion, rotatably connected to the fixed member, the rotating member comprising at least one second contact that is electrically connected to the at least one first contact of the first member.

The electrical connector assembly may further comprise a first flexible printed circuit board configured to electrically connect the fixed member to a first printed circuit board of the first body. The electrical connector assembly may further comprise a second flexible printed circuit board configured to electrically connect the rotating member to a second printed circuit board of the second body.

The fixed member may comprise a housing having a receiving space and a disc installed inside the receiving space, the disc having circuit patterns on a first side and a second side. The fixed member may also comprise an inter-connector configured to electrically connect the first flexible printed circuit board to the disc, the inter-connector installed inside the receiving space to elastically support the disc.

The rotating member may comprises a plurality of housings successively and rotatably coupled to each other, each of the plurality of housings configured to provide a receiving space at a first side and having a plurality of contacts at a second side. The rotating member may also comprise a plurality of discs installed inside the receiving space of each of the plurality of housings, the plurality of discs having circuit patterns on a first side and a second side. The rotating member may also comprise an inter-connector configured to electrically connect the plurality of contacts with the plurality of discs, the inter-connector installed inside the plurality of housings to elastically support the plurality of discs. The rotating member may further comprise a plurality of rotating parts and wherein a rotating part at a first end of the rotating member is rotatably coupled to the fixed member and a rotating part at a second end of the rotating member is fixed to the second body. Each contact of the rotating part at the first end of the rotating member may contact a circuit pattern of a disc installed inside the housing of the fixed member. Furthermore, each contact of the plurality of rotating parts may contact with a corresponding circuit pattern.

The second flexible printed circuit board may be configured to electrically connect the at least one of the plurality of rotating parts to the second printed circuit board of the second body. When a user opens or closes the second body, the plurality of rotating part may be sequentially and successively rotated by an angle of 30°, for example. The electrical connector assembly may also comprise a stopping protrusion and a stopping groove, formed at a housing of each of the plurality of rotating parts such that when the user opens or closes the second body, the plurality of rotating parts are sequentially and successively rotated. The fixed member and/or the rotating member may have a round shape.

In another embodiment, a mobile terminal having an electrical connector assembly comprises a first body and a second body rotatably connected to the first body by a hinge portion. The hinge portion comprises a fixed member having at least one first contact and a rotating member, rotatably connected to the fixed member, the rotating member comprising at least one second contact that is electrically connected to the at least one first contact of the fixed member.

The rotating member may further comprise a plurality of rotating parts and wherein a rotating part at a first end of the rotating member is rotatably coupled to the fixed member and a rotating part in between the first end of the rotating member and a second end of the rotating member is fixed to the second body.

The present invention provides a circuit connection structure inside a hinge portion between a first body and a second body in a mobile terminal that may reduce breakage and/or damage to a flexible printed circuit board.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. An electrical connector assembly in a mobile terminal, the mobile terminal comprising a first body coupled to a second body by a hinge portion, the electrical connector assembly comprising:
   a fixed member disposed in the hinge portion, having at least one first contact; and
   a rotating member disposed in the hinge portion, rotatably connected to the fixed member, the rotating member comprising at least one second contact that is electrically connected to the at least one first contact of the fixed member,
   wherein the fixed member comprises a disc having circuit patterns installed in a receiving space of a housing, the disc being electrically connected to an inter-connector that supports the disc elastically in the receiving space.

2. The electrical connector assembly of claim 1, further comprising:
   a first flexible printed circuit board configured to electrically connect the fixed member to a first printed circuit board of the first body.

3. The electrical connector assembly of claim 2, further comprising:
   a second flexible printed circuit board configured to electrically connect the rotating member to a second printed circuit board of the second body.

4. An electrical connector assembly in a mobile terminal, the mobile terminal comprising a first body coupled to a second body by a hinge portion, the electrical connector assembly comprising:
   a fixed member disposed in the hinge portion, having at least one first contact; and
   a rotating member disposed in the hinge portion, rotatably connected to the fixed member, the rotating member comprising at least one second contact that is electrically connected to the at least one first contact of the fixed member,
   wherein the fixed member comprises:
   a housing having a receiving space at a first side;
   a disc installed inside the receiving space, the disc having circuit patterns on a first side and a second side; and
   an inter-connector installed inside the receiving space to elastically support the disc.

5. An electrical connector assembly in a mobile terminal, the mobile terminal comprising a first body coupled to a second body by a hinge portion, the electrical connector assembly comprising:
   a fixed member disposed in the hinge portion, having at least one first contact;
   a rotating member disposed in the hinge portion, rotatably connected to the fixed member, the rotating member comprising at least one second contact that is electrically connected to the at least one first contact of the fixed member;
   a first flexible printed circuit board adapted to electrically connect the fixed member to a first printed circuit board of the first body;
   a second flexible printed circuit board adapted to electrically connect the rotating member to a second printed circuit board of the second body; and
   wherein the rotating member comprises:
   a plurality of housings successively and rotatably coupled to each other, each of the plurality of housings configured to provide a receiving space at a first side and having a plurality of contacts at a second side;
   a plurality of discs installed inside the receiving space of each of the plurality of housings, the plurality of discs having circuit patterns on a first side and a second side; and
   an inter-connector configured to electrically connect the plurality of contacts with the plurality of discs, the inter-connector installed inside the plurality of housings to elastically support the plurality of discs.

6. The electrical connector assembly of claim 5, wherein the rotating member further comprises a plurality of rotating parts and wherein a rotating part at a first end of the rotating member is rotatably coupled to the fixed member and a rotating part at a second end of the rotating member is fixed to the second body.

7. The electrical connector assembly of claim 6, wherein each contact of the rotating part at the first end of the rotating member contacts a circuit pattern of a disc installed inside the housing of the fixed member.

8. The electrical connector assembly of claim 7, wherein each contact of the plurality of rotating parts contacts with a corresponding circuit pattern.

9. The electrical connector assembly of claim 8, wherein the second flexible printed circuit board is configured to electrically connect the at least one of the plurality of rotating parts to the second printed circuit board of the second body.

10. The electrical connector assembly of claim 8, wherein when a user opens or closes the second body, the plurality of rotating part are sequentially and successively rotated by an angle of about 30°.

11. The electrical connector assembly of claim 10, further comprising:
a stopping protrusion and a stopping groove, formed at a housing of each of the plurality of rotating parts such that when the user opens or closes the second body, the plurality of rotating parts are sequentially and successively rotated.

12. The electrical connector assembly of claim 1, wherein the fixed member has a round shape.

13. The electrical connector assembly of claim 1, wherein the rotating member has a round shape.

14. A mobile terminal having an electrical connector assembly, the mobile terminal comprising:
a first body;
a second body rotatably connected to the first body by a hinge portion;
wherein the hinge portion comprises:
a fixed member having at least one first contact; and
a rotating member, rotatably connected to the fixed member, the rotating member comprising at least one second contact that is electrically connected to the at least one first contact of the fixed members,
wherein the fixed member comprises a disc having circuit patterns installed in a receiving space of a housing, the disc being electrically connected to an inter-connector that supports the disc elastically in the receiving space.

15. The mobile terminal of claim 14, further comprising:
a first flexible printed circuit board configured to electrically connect the fixed member to a first printed circuit board of the first body; and
a second flexible printed circuit board configured to electrically connect the rotating member to a second printed circuit board of the second body.

16. The mobile terminal of claim 15, wherein the fixed member comprises:
a housing having a receiving space at a first side; and
a disc installed inside the housing and having circuit patterns on a first surface and a second surface.

17. The mobile terminal of claim 15, wherein the rotating member comprises:
a plurality of housings successively and rotatably coupled to each other, each of the plurality of housings configured to provide a receiving space at a first side and having a plurality of contacts at a second side;
a plurality of discs installed inside the receiving space of each of the plurality of housings, the plurality of discs having circuit patterns on a first surface and a second surface; and
an inter-connector configured to electrically connect the plurality of housings with the plurality of discs, the inter-connector installed inside the receiving space of plurality of housings to elastically support the plurality of discs.

18. The mobile terminal of claim 17, wherein the rotating member further comprises a plurality of rotating parts and wherein a rotating part at a first end of the rotating member is rotatably coupled to the fixed member and a rotating part in between the first end of the rotating member and a second end of the rotating member is fixed to the second body.

19. The mobile terminal of claim 18, wherein each contact of the plurality of rotating parts contacts with a corresponding circuit pattern.

20. The mobile terminal of claim 18, wherein when the user opens or closes the second body, the plurality of rotating parts are sequentially and successively rotated by an angle of about 30°.

21. The mobile terminal of claim 20, further comprising:
a stopping protrusion and a stopping groove, formed at a housing of each of the plurality of rotating parts such that when the user opens or closes the second body, the plurality of rotating parts are sequentially and successively rotated.

22. The mobile terminal of claim 14, wherein the fixed member has a round shape.

23. The mobile terminal of claim 14, wherein the rotating member has a round shape.

* * * * *